Aug. 16, 1938.  F. S. HODGMAN ET AL  2,126,887
POSITIONAL CONTROL SYSTEM
Filed July 5, 1935  3 Sheets-Sheet 2
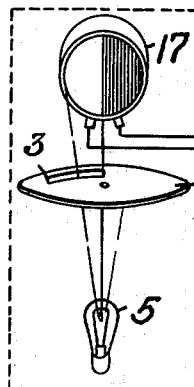
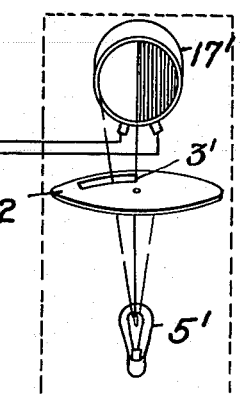
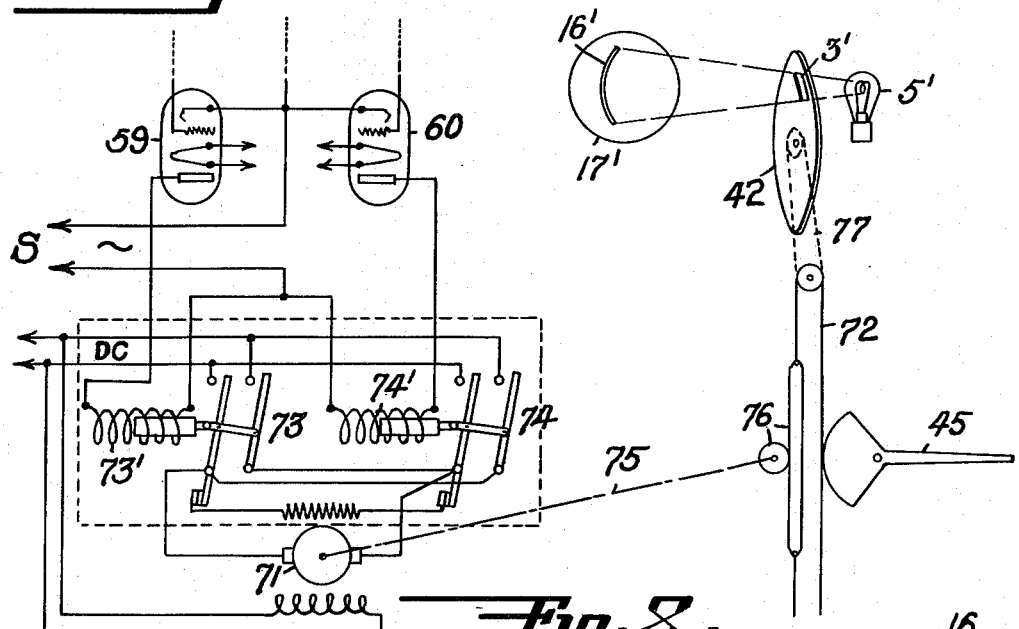
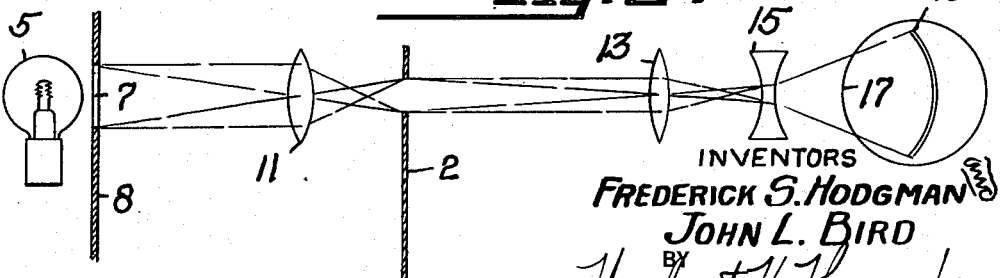
INVENTORS
FREDERICK S. HODGMAN
JOHN L. BIRD
BY
Herbert H. Thompson
THEIR ATTORNEY

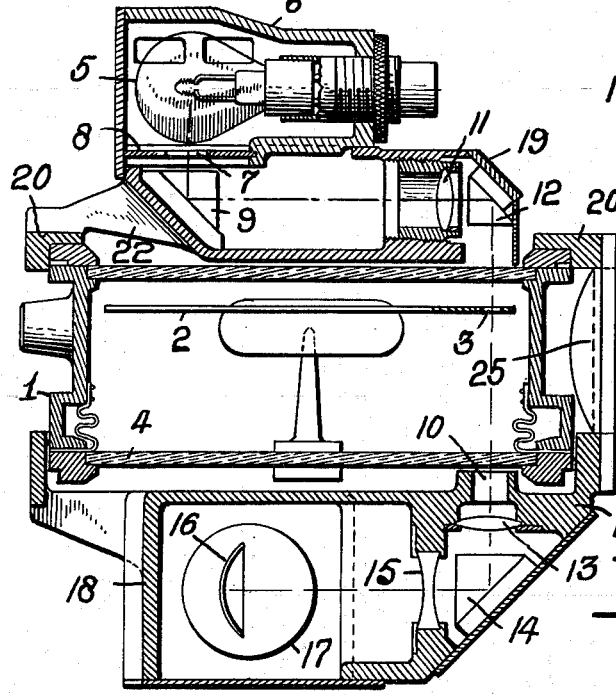

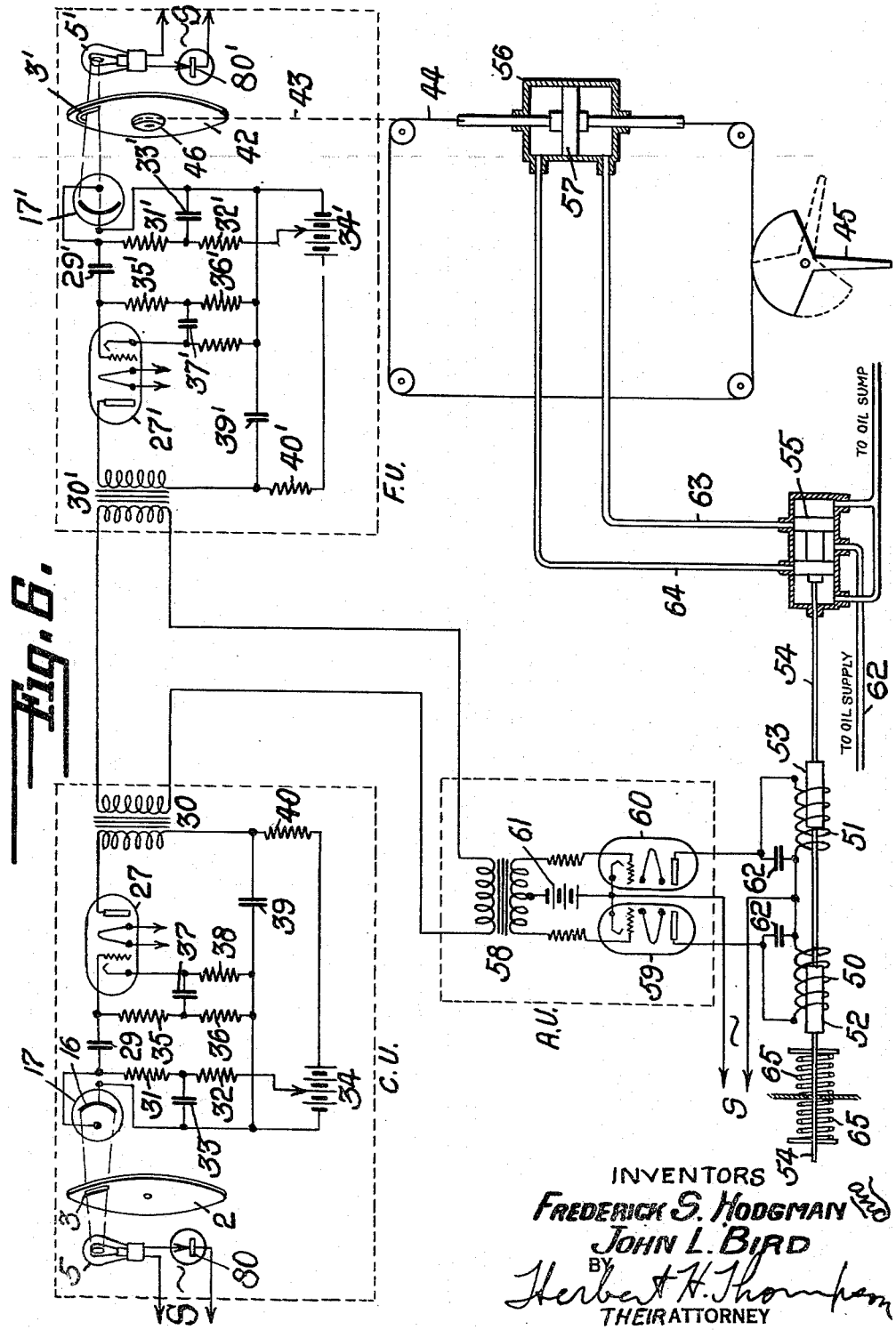

Patented Aug. 16, 1938

2,126,887

UNITED STATES PATENT OFFICE 2,126,887

POSITIONAL CONTROL SYSTEM

Frederick S. Hodgman, Glen Rock, and John L. Bird, Radburn, N. J., assignors to Sperry Gyroscope Company, Inc., Brooklyn, N. Y., a corporation of New York Application July 5, 1935, Serial No. 29,958

14 Claims. (Cl. 172—282)

This invention relates generally to positional control of objects by electrical means and the invention has reference, more particularly, to a novel positional control system employing phototube means for producing a control potential, the said system having electrical follow-up means for bringing the controlled or secondary element to rest in correspondence with the controlling means or primary element.

The present system is especially applicable for the automatic steering of water or air craft as, for example, the control of the rudder of a ship from a sensitive indicator, such as a magnetic compass, the compass control mechanism having no frictional contacts and placing no resistance whatever on the free movement of the compass card. The system of this invention is also adapted to be employed as a follow-up system for a sensitive element, such as a gyroscopic compass. It may also be used to transmit to a remote point or points the indications of meters or other indicators, and to control from such indications apparatus requiring power for its operation, by means of the circuits to be described. Thus, voltage regulators and similar devices may be controlled by direct pick-off from meter indications.

As the pick-off means from the sensitive element, we propose to employ a phototube adapted to receive light from a suitable source, shutter means being interposed between the light source and phototube and associated with the sensitive element for varying the magnitude of the light falling upon the cell in accordance with the movements of the sensitive element.

The principal object of the present invention is to provide a novel positional control system having phototube means, responsive to light variations due to movement of the sensitive or primary element, for producing a signal potential, means being provided for amplifying said signal potential and for applying the amplified signal to the grids of grid controlled rectifiers, the output circuits of said rectifiers being used to determine the operation of the controlled or secondary element.

Another object of the present invention is to so incorporate shutter means with the sensitive element that the said shutter means is totally frictionless in operation, adapting the same to be actuated in its movements by delicate indicating or metering mechanism as well as by more powerful hand or power operated controllers.

Still another object of the present invention is to provide a novel control system that is applicable to the remote control of ponderable objects from sensitive indicating or metering means, wherein the secondary or controlled element has shutter means associated therewith for varying the magnitude of light received by a second phototube means, said latter means serving to supply a counter potential for opposing the control signal potential, said counter potential being adapted to completely nullify said signal potential when said secondary element has reached synchronism with said primary element; said system being also applicable to follow-up systems wherein movement of the controlling or primary element relative to the follow-up or secondary element produces a variable signal potential that serves to control the operation of motive means connected to the secondary element, said motive means acting to cause the secondary element to realign itself with said primary element, while simultaneously driving auxiliary units, if desired.

Other objects and advantages will become apparent from the specification, taken in connection with the accompanying drawings wherein one embodiment of the invention is illustrated.

In the drawings,

Fig. 1 is a vertical sectional view of a ship's magnetic compass employed as the sensitive or primary element of this invention, the said compass having shutter and phototube means associated therewith.

Fig. 2 is a plan view of the structure of Fig. 1.

Fig. 3 is a view similar to Fig. 1, of a somewhat modified construction.

Fig. 4 is a fragmentary view looking upwardly at the bottom of the structure of Fig. 1, with a bottom plate removed.

Fig. 5 is a schematic view illustrating features of operation of phototubes employed in the invention.

Fig. 6 is a wiring diagram of the electrical circuits involved and also shows schematically means for operating the secondary element.

Fig. 7 is a wiring diagram illustrating a slightly modified arrangement for controlling the secondary element.

Fig. 8 is a schematic view of the optical system employed.

Referring now to Figs. 1, 2, 4, 6 and 8, the reference numeral 1 designates a magnetic compass adapted for use on shipboard and the like, the said compass having its card 2 provided with angularly spaced arcuate slots 3, illustrated as five in number, the said slots 3 being equally spaced with respect to one another and extending concentrically with respect to the compass card pivot support at a common radius therefrom. The bottom 4 of the compass bowl is transparent so that light may pass through the same.

A suitable light source, such as a lamp 5, is contained within a casing 6 above the compass 1. Light from lamp 5 passes downwardly through an aperture 7 in an opaque diaphragm 8 and is diverted by a prism 9 along a horizontal path. The aperture 7 is illustrated in Fig. 2 as being square in shape, thereby producing a square beam of light incident upon the prism 9, although this aperture may be of other shapes, such as rectangular or round. From the prism 9, the light beam passes to a converging lens 11, and thence the same passes to a prism 12 which serves to deflect the beam downwardly.

Lens 11 serves to form a reduced image of the aperture 7 upon the card 2 at a point at the same radial distance from the compass pivot as the slots 3, so that should one of these slots be under the prism 12, light will pass down through such slot, through the transparent bottom 4, and through an opening 10 in a casing 18 positioned below compass 1. Within casing 18 this light falls on a converging lens 13. The light leaving lens 13 is again deflected horizontally by a prism 14 onto a diverging lens 15. Lens 13 serves to produce an image of the portion of the light beam passing through slot 3 upon the lens 15, which lens in turn acts to produce an enlarged image of the same upon the cathode 16 of a phototube 17 contained within the casing 18.

The casing 6 is fixed on top of a casing or tripod 19 containing the prisms 9 and 12 and lens 11 and having three legs fixed to a ring member 20 that is turnably mounted upon the top of compass 1. Two of the legs 22 and 22' of the casing or tripod 19 have radial sight apertures or slots 23 therein for aid in aligning these legs with radial lines 24 provided upon the card 2 adjoining corresponding ends of the slots 3. The legs 22 and 22' are so disposed with respect to casing 19 that their sight slots 23 may be vertically aligned with the lines 24 associated with two of the slots 3, at which time the center of prism 12 will be vertically aligned with the line 24 of a slot 3 located between the said two slots, as shown in Fig. 2.

The casing 18 is connected as by a vertical yoke 25 to the ring member 20, so that should this ring member be turned, the casing 18 will also turn, whereby lens 13 is always retained in vertical alignment with prism 12. The optical system of Fig. 1 is shown schematically in lineal form in Fig. 8, the prisms being omitted for the sake of simplicity and the formation of light images being illustrated by dash lines.

As shown in Fig. 6, the variable signal potential output of phototube 17 is connected through a condenser 29 to the grid of a triode amplifier 27, the output circuit of which has the primary of a transformer 30 connected therein. Resistance 31 serves as an impedance in the output of phototube 17. Condenser 33 serves as a path for variable currents and battery 34 supplies the necessary voltage to the anodes of tubes 17 and 27. Resistances 35, 38 and 36 place the necessary biasing voltage upon the grid of tube 27, which serves to amplify the voltage output of phototube 17. Condensers 37 and 39 are filter by-pass condensers, acting in conjunction with resistances 36 and 40. A half wave rectifier 80 is included in the A. C. supply for lamp 5 fed from an A. C. source S so that this lamp pulsates at supply frequency. Filament circuits are omitted in the wiring diagram for the sake of simplicity. The lamp 5, the primary element or compass card 2 acting also as a shutter, phototube 17 and the thermionic amplifier are ordinarily located at the helmsman's position on the ship and are enclosed by dash lines in Fig. 6 and designated C. U., standing for control unit.

A follow-up or repeat-back unit, designated F. U. in Fig. 6, is similar to the control unit C. U. with the exception that the shutter 42, though physically similar to card 2, is operated as by a cable 43 connected to the tiller cable system 44 operating the ship rudder 45. Suitable torsion spring means may be employed to retain the cable 43 wound taut upon the drum 46. The parts of the follow-up unit corresponding to parts of the control unit are designated by the same numbers but using primes for purposes of differentiation.

The outputs of the secondaries of transformers 30 and 30' are connected so as to oppose each other and are led into the amplifying device or unit designated A. U., which may be any suitable sort, the output of which controls the supply of operating current to two solenoids 50 and 51. Solenoids 50 and 51 have armatures 52 and 53 fixed upon a rod 54 connected to a piston valve 55 that controls the supply of pressure operating fluid, such as oil, to the cylinder 56 of the tiller cable operating piston 57.

Amplifying unit A. U. is shown as comprising a transformer 58 for receiving the signal potential and for applying the same to the grids of opposed grid controlled rectifier tubes 59 and 60. Since the light supply to phototubes 17 and 17' pulsates at the frequency of the A. C. source S, the A. C. amplified signal outputs of units C. U. and F. U. are of proper frequency for controlling rectifier tubes 59 and 60. If the rectifiers 80 and 80' were not used, the light from lamps 5 and 5' would pulsate at twice line frequency, in which event the amplified output of tubes 17 and 17' would be unsuitable for proper control of tubes 59 and 60. A D. C. bias 61 is applied to the grids of tubes 59 and 60 for rendering these tubes non-conducting when no signal is supplied through transformer 58. The source S is connected through solenoids 50 and 51 to the plates of tubes 59 and 60. Condensers 62 serve as filter condensers. When tube 59 is rendered conducting, the solenoid 50 is energized, thereby moving rod 54 in one direction so as to move valve 55 in the same direction from its neutral position shown to one end position, in which position oil is supplied from pipe 62 through valve 55 and pipe 63 to cylinder 56, thereby causing piston 57 to move tiller cable 44 to operate rudder 45 in one direction. When tube 60 is rendered conducting, the solenoid 51 is energized, moving rod 54 in the reverse direction so that oil is supplied from pipe 62 to pipe 64, thereby effecting the operation of rudder 45 in the reverse direction. Centering springs 65 are provided on rod 54 for returning valve 55 to its central shut-off position, when solenoids 50 and 51 are de-energized.

In use, assuming that it is desired to steer the ship on a determined compass course, for example, due north, the ship's head is put on that course as illustrated in Fig. 2. The tripod 19 is then turned, if necessary, so that two of the compass card lines 24 may be seen through the sight apertures 23 of the legs 22 and 22', thereby positioning the center of prism 12 over the end of the slot 3 intermediate the two slots underlying legs 22 and 22'. The lamps 5 and 5' are now lighted, and if the rudder 45 is correctly set on the course, i. e., if it lies in a plane extending due north and south, the phototubes 17 and 17' each receive equal quantities of light, i. e., that derived from one half the light beam, and hence the outputs of these tubes and that of the control unit C. U. and follow-up unit F. U. are equal and opposed, so that no signal potential is supplied to the amplifying unit A. U. and hence rudder 45 is not operated.

If, however, the ship should deviate from its north course, the tripod 19 will move with respect to the compass card 2 so that more or less light will fall on phototube 17, depending on the direction of the ship's deviation. Thus, should the ship yaw to starboard, the tripod 19 will move clockwise over compass card 2 so that more than half the width of the light beam passes through slot 3, whereby phototube 17 is caused to receive more light than before so that its output correspondingly increases, which output is amplified by tube 27 and supplied through transformers 30 and 58 to render rectifier tube 59 conducting and effecting the swinging of rudder 45 to port so that the ship's head is swung to port to correct the starboard yaw.

Movement of rudder 45 causes the follow-up unit F. U. to operate to position the rudder proportionally to the ship's deviation from its set course. Thus, as the rudder swings over in response to the signal potential produced by phototube 17, the cable 43 is actuated to cause shutter 42 to admit more light to phototube 17' so that the potential output of the follow-up unit F. U. is increased to oppose and reduce the effectiveness of the signal potential leaving control unit C. U. As the ship, in response to the movement of its rudder, moves towards its correct heading, the tripod 19 will move counter-clockwise with respect to the compass card, thereby decreasing the amount of light falling on phototube 17 so that the output of the control unit is so reduced that the opposing potential of the follow-up unit causes rectifier tube 60 to become conducting, resulting in the movement of rudder 45 back toward its fore and aft position. As the ship reaches its proper heading, the outputs of the control and follow-up units are again equal so that both tubes are non-conducting and the system returns to its normal position, illustrated in Fig. 6. Should the ship yaw to port, the operation is similar except that the tube 60 will be first operated owing to the higher potential output of the follow-up unit, thereby moving the rudder to starboard and correcting the yaw. Preferably, the amplifier unit A. U. and the follow-up unit F. U. are located near the rudder operating mechanism, but this is not essential.

In Fig. 3 there is illustrated a slightly modified form of compass arrangement. In this figure, the lamp 5 is placed below the compass 1'. Light from lamp 5 passes through aperture 7' in diaphragm 8' and is reflected by mirror 66 to pass through condensing lens 11. From lens 11 the beam is reflected by mirrors 67 and converges upon the card 2 having arcuate slots 3. After passing through a slot 3, the beam passes through the converging lens 13 and is reflected by mirror 68 to converge upon diverging lens 15, which produces an enlarged image upon the cathode 16 of phototube 17. Casing 69, containing the optical system, is turnable upon compass 1' so that the width of the light beam is cut in half by the card when the ship is properly on her course.

Fig. 5 illustrates schematically a use of the phototubes. If Weston "Photronic" cells or cells of equal output are employed as tubes 17 and 17', a sensitive galvanometer 70 may be used to give an indication to the helmsman of the relative values of the angle of deviation of the ship and the angle of the rudder from its fore and aft position.

In Fig. 7, a direct current motor 71 is employed for operating the tiller cable 72 in lieu of the hydraulic system of Fig. 6. Grid controlled rectifiers 59 and 60 in this figure determine the supply of operating current to reversing relay coils 73' and 74'. The motor 71 drives shaft 75 and gearing 76 to effect operation of tiller cable 72 and rudder 45. Thus, when rectifier 59 is passing current, coil 73' is energized to close relay 73, thereby supplying current in one direction to the armature of motor 71 and causing this motor to turn in one direction and effect movement of rudder 45. When rectifier 60 is passing current, coil 74' is energized to close relay 74, thereby supplying current in the opposite direction to the armature of motor 71 and causing this motor to turn in the opposite direction so that rudder 45 is also turned in the opposite direction. A cable 77 serves to operate shutter 42 of the follow-up unit previously described.

While the positional control system of this invention has been described in connection with the automatic steering of ships, it is to be understood that the same is applicable to many uses.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

If desired, the lamps 5 and 5' could be supplied with D. C., in which case the plate currents of tubes 27 and 27' would be supplied with A. C. voltage from the source S. Owing to the definite, controllable light beam reaching the phototubes 17 and 17' corresponding to desired angles of rudder throw, the present system is adapted for use without the employment of limit switches generally essential with equipment of this type.

Having described our invention, what we claim and desire to secure by Letters Patent is:

1. In an automatic steering system for dirigible craft, a compass element and a rudder controlled therefrom, motive means for driving said rudder, a non-contacting non-reactive controller responsive to said compass element, said controller serving to provide a control potential tending to cause the operation of said motive means and hence said rudder in but one direction throughout the range of movement of said compass element, and a second non-contacting controller responsive to said rudder, said second controller serving to provide a follow-up potential for opposing said control potential and tending to cause the operation of said motive means and hence the rudder in the reverse direction.

2. In a positional control system, a sensitive element, a control unit having phototube means responsive to movements of said sensitive element for producing a variable signal potential, a controlled element, motive means for operating said controlled element, an amplifier arranged to receive said signal potential and acting to determine the operation of said motive means, and a second phototube means responsive to the operation of said controlled element for producing a variable potential for opposing said signal potential.

3. In a positional control system, a movable primary element and a remotely located secondary element, motive means for moving said secondary element, and control means for said motive means, said control means comprising a frictionless non-reactive controller responsive to movement of said primary element adapted to produce a signal potential tending to cause said motive means to operate in but one direction regardless of the extent of movement of said primary element, a second frictionless controller responsive to movement of said secondary element and adapted to produce a follow-up signal potential tending to cause said motive means to operate in the reverse direction, said signals being combined to operate said motive means.

4. In a positional control system, a controlling element, a controlled element, motive means for operating said controlled element, a phototube responsive to movements of said controlling element, means for amplifying the output of said phototube, control means operated by said last named means for determining the operation of said motive means, and a follow-up comprising a phototube responsive to the operation of said controlled element and means for amplifying the output of said last named phototube for opposing the amplified output of said first named phototube.

5. In a positional control system, a sensitive element, a control unit having a light source, a phototube for receiving light from said source, shutter means associated with said sensitive element for varying the quantity of light falling on said phototube in response to movements of said sensitive element, a thermionic amplifier for amplifying the output of said phototube, a controlled element, motive means for operating said controlled element, electrical control means for said motive means, the output of said amplifier being supplied to said control means, and electrical follow-up means operated from said motive means, the output of said follow-up means being employed to oppose the output of said amplifier.

6. In a positional control system, a sensitive element, a control unit having a light source, a phototube for receiving light from said source, shutter means associated with said sensitive element for varying the quantity of light falling on said phototube in response to movements of said sensitive element, a thermionic amplifier for amplifying the output of said phototube, a controlled element, motive means for operating said controlled element, electrical control means for said motive means, the output of said amplifier being supplied to said control means, and electrical feed back means operated from said controlled element for opposing the amplified output of said phototube.

7. In a positional control system, a primary element, a phototube, said primary element having shutter means associated therewith for determining the quantity of light received by said phototube, a secondary element, motive means for operating said secondary element, a second phototube, said secondary element having shutter means associated therewith for determining the quantity of light received by said second phototube, means for amplifying the outputs of said phototubes and for connecting said amplified outputs in opposition, a rectifier controlled by the resultant of said amplified outputs, and means supplied with operating energy from said rectifier for determining the operation of said motive means.

8. In a positional control system, a primary element, a secondary element, motive means for driving said secondary element, control means for said motive means, similar control and follow-up units, each of said units comprising a light source, a phototube, shutter means for determining the quantity of light received from said source by said phototube, and an amplifier for amplifying the output of said phototube, the shutter means of said control and follow-up units being operated in accordance with the movements of said primary and secondary elements, respectively, the amplified outputs of said phototubes being connected in opposition for determining the operation of said control means.

9. In a positional control system, a sensitive element, a control unit having a light source, an A. C. supply for said light source having half-wave rectifier means therein for causing said light source to pulsate at the frequency of said supply, a phototube for receiving light from said source, shutter means associated with said sensitive element for varying the quantity of light falling on said phototube in response to movements of said sensitive element, means for amplifying the output of said phototube, a rectifier supplied from said A. C. supply and controlled by the amplified output of said phototube, and motive means controlled by said rectifier.

10. In a positional control system, a primary element, a secondary element, motive means for driving said secondary element, an A. C. supply, control means fed from said supply for controlling said motive means, similar control and follow-up units, each of said units comprising a light source fed from said A. C. supply, a half-wave rectifier in said supply for causing said light source to pulsate at the frequency of said supply, a phototube, shutter means for determining the quantity of light received from said source by said phototube, and an amplifier for amplifying the output of said phototube, the shutter means of said control and follow-up units being operated in accordance with the movements of said primary and secondary elements, respectively, the amplified outputs of said phototubes being connected in opposition for determining the operation of said control means.

11. In a positional control system, movable primary and secondary elements, motive means for operating said secondary element, frictionless non-contacting non-inductive electrical means operated in response to movements of said primary element for producing a potential tending to cause the operation of said motive means in but one direction regardless of the extent of movement of said primary element, a similar control means operated in response to movements of said secondary element for producing an opposing potential tending to cause the operation of said motive means in the reverse direction, said motive means being controlled by the resultant of said opposing potentials.

12. In a control system of the character described, an alternating current supply, a pair of lamps connected to said supply to be fed therefrom, half wave rectifiers included in circuit with said lamps whereby the latter are caused to pulsate at supply frequency, a pair of photo-tubes arranged to be respectively excited by said respective lamps, movable control members for controlling the supply of light from said lamps to said photo-tubes, a compass element for operating one of said control members, thermionic amplifiers energized from said supply and arranged to be respectively controlled at least in part from the output of said respective photo-tubes, a servo mechanism controlled by said amplifiers, and repeat back mechanism operated from said servo mechanism for operating the second of said control members.

13. In a control system of the character described, an alternating current supply, a lamp connected to said supply to be fed therefrom, a half wave rectifier included in said connection whereby said lamp is caused to pulsate at supply frequency, a photo-tube arranged to be excited by said lamp, a control member for controlling the supply of light from said lamp to said photo-tube, a thermionic amplifier energized from said supply and arranged to be controlled at least in part from the output of said photo-tube, a servo mechanism controlled by said amplifier, and an electrical repeat back mechanism operated from said servo mechanism for opposing said repeat back mechanism comprising a lamp connected to be energized from said supply, a half wave rectifier included in the connection between said lamp and said supply, a photo-tube excited from said lamp, and a control member actuated by said servo mechanism for controlling the supply of light from said lamp to said photo-tube, said photo-tube having its output employed to oppose the output of said first named photo-tube.

14. In a positional control system, a movable primary element and a remotely located secondary element, motive means for moving said secondary element, and control means for said motive means, said control means comprising a frictionless controller responsive to movement of said primary element adapted to produce a motivating force tending to cause said motive means to operate in but one direction throughout the range of movement of said primary element, and a second frictionless controller responsive to movement of said secondary element and adapted to produce an opposing motivating force tending to cause said motive means to operate in the reverse direction, said motivating forces together operating said motive means.

FREDERICK S. HODGMAN.
JOHN L. BIRD.